United States Patent
Engel

(10) Patent No.: US 11,297,760 B2
(45) Date of Patent: Apr. 12, 2022

(54) AGRICULTURAL IMPLEMENT HAVING MID-MOUNTED FERTILIZER APPLICATORS

(71) Applicant: CNH Industrial Canada, Ltd., Saskatoon (CA)

(72) Inventor: Gordon Anthony Engel, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 409 days.

(21) Appl. No.: 16/402,642

(22) Filed: May 3, 2019

(65) Prior Publication Data
US 2020/0344942 A1  Nov. 5, 2020

(51) Int. Cl.
| | |
|---|---|
| A01C 7/06 | (2006.01) |
| A01C 5/06 | (2006.01) |
| A01C 7/00 | (2006.01) |
| A01C 7/20 | (2006.01) |
| A01C 21/00 | (2006.01) |

(52) U.S. Cl.
CPC ............... *A01C 7/06* (2013.01); *A01C 5/064* (2013.01); *A01C 7/006* (2013.01); *A01C 7/208* (2013.01); *A01C 21/005* (2013.01)

(58) Field of Classification Search
CPC .......... A01C 5/064; A01C 7/006; A01C 7/06; A01C 7/208; A01C 21/005
See application file for complete search history.

(56) References Cited

U.S. PATENT DOCUMENTS

| | | | |
|---|---|---|---|
| 5,140,917 | A | 8/1992 | Swanson |
| 5,331,907 | A | 7/1994 | Beaujot |
| 6,216,616 | B1 | 4/2001 | Bourgault |

(Continued)

FOREIGN PATENT DOCUMENTS

| | | | |
|---|---|---|---|
| CA | 2224854 | 6/1999 | |
| WO | WO-8605352 A1 * | 9/1986 | ............... A01C 7/04 |
| WO | 2010091469 | 8/2010 | |

OTHER PUBLICATIONS

Bourgault, "3310 Paralink Hoe Drill," http://www.bourgault.com/SearchProduct/ViewProduct/tabid/168/docid/38/mode/1/New/true/IsSearch/false/language/en-US/Default.aspx, Nov. 23, 2016, 3 pages.

(Continued)

*Primary Examiner* — Thomas B Will
*Assistant Examiner* — Ian A Normile
(74) *Attorney, Agent, or Firm* — Rebecca L. Henkel; Rickard K. DeMille

(57) ABSTRACT

An agricultural implement includes a frame, a first row of row units coupled to the frame, and a second row of row units coupled to the frame. The second row of row units is positioned behind the first row of row units relative to a direction of travel, and each row unit is configured to deposit seeds into the soil. The agricultural implement also includes a row of fertilizer applicators coupled to the frame and positioned between the first row and the second row of row units relative to the direction of travel. Each fertilizer applicator is laterally positioned between one row unit of the first row and one row unit of the second row that is laterally adjacent to the one row unit of the first row, and each fertilizer applicator is configured to direct displaced soil laterally toward the one row unit of the second row.

20 Claims, 3 Drawing Sheets

(56) References Cited

U.S. PATENT DOCUMENTS

| | | |
|---|---|---|
| 7,004,090 B2 | 2/2006 | Swanson |
| 7,159,523 B2 | 1/2007 | Bourgault et al. |
| 7,412,933 B2 | 8/2008 | Bourgault et al. |
| 7,455,020 B1 | 11/2008 | Cresswell et al. |
| 7,540,246 B2 | 6/2009 | Friesen et al. |
| 7,568,438 B2 | 8/2009 | Arksey |
| 7,581,503 B2 | 9/2009 | Martin et al. |
| 7,617,784 B2 | 11/2009 | Friggstad |
| 7,673,571 B2 | 3/2010 | Medernach |
| 7,900,568 B2 | 3/2011 | Senshuk |
| 8,191,490 B2 | 6/2012 | Tobin |
| 8,205,566 B2 | 6/2012 | Martin |
| 8,215,247 B2 | 7/2012 | Schilling et al. |
| 8,272,339 B2 | 9/2012 | Schilling et al. |
| 8,464,649 B2 | 6/2013 | Schilling et al. |
| 8,646,395 B2 | 2/2014 | Schilling et al. |
| 9,137,941 B2 | 9/2015 | Stark |
| 9,148,989 B2 | 10/2015 | Van Buskirk et al. |
| 9,445,538 B2 | 9/2016 | Roth et al. |
| 9,451,740 B2 | 9/2016 | Kowalchuk |
| 2002/0056407 A1 | 5/2002 | Milne |
| 2013/0228108 A1 | 9/2013 | Schilling et al. |
| 2013/0255974 A1* | 10/2013 | Scherman ............... A01C 7/208 172/1 |
| 2015/0334915 A1* | 11/2015 | Mead ..................... A01C 7/201 111/170 |
| 2017/0318727 A1 | 11/2017 | Roberge et al. |
| 2017/0318736 A1 | 11/2017 | Roberge et al. |
| 2019/0208697 A1* | 7/2019 | Janzen .................. A01C 5/062 |
| 2019/0249818 A1* | 8/2019 | Sheppard ............... A01C 7/208 |
| 2021/0127554 A1* | 5/2021 | Chaplin ................ A01C 5/062 |

OTHER PUBLICATIONS

Bourgault, "MRS III Fertilizer Application System," https://www.bourgault.com/product/en-US/mrb-mrs-fertilizer-applicators/803/mrs-iii-fertilizer-application-system.aspx, Apr. 27, 2018, 2 pages.

Bourgault, "Mid Row Band, The Ideal Location for Nitrogen Fertilizer in a One-Pass Seeding Operation," https://www.bourgault.com/ProductsEquipment/Agronomy/Idealfertilizerplacement/tabid/303/language/en-US/Default.aspx, Apr. 27, 2018, 3 pages.

* cited by examiner

AGRICULTURAL IMPLEMENT HAVING MID-MOUNTED FERTILIZER APPLICATORS

BACKGROUND

The present disclosure relates generally to an agricultural implement having mid-mounted fertilizer applicators.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds into the trench. The opener/seed tube may be followed by closing discs that move displaced soil back into the trench and/or a packer wheel that packs the soil on top of the deposited seeds.

Certain seeding implements include fertilizer applicators configured to provide fertilizer to the deposited seeds. The fertilizer applicators are generally positioned forward or rearward of the row units relative to a direction of travel of the seeding implement. For example, a seeding implement may include a first row of fertilizer applicators, a second row of row units, and a third row of row units, or the seeding implement may include a first row of row units, a second row of row units, and a third row of fertilizer applicators. Unfortunately, positioning the fertilizer applicators forward or rearward of the row units interferes with access to the row units, thereby increasing the time associated with reconfiguring the row units (e.g., to adjust the depth of the seeding path/trench). As a result, the process of reconfiguring the row units may substantially delay seeding operations, thereby reducing the efficiency of the seeding process.

BRIEF DESCRIPTION

In certain embodiments, an agricultural implement includes a frame and a first row of row units coupled to the frame. Each row unit of the first row of row units is configured to deposit seeds into soil. The agricultural implement also includes a second row of row units coupled to the frame. The second row of row units is positioned behind the first row of row units relative to a direction of travel of the agricultural implement, each row unit of the second row of row units is configured to deposit seeds into the soil, and each row unit of the second row of row units is laterally offset from a respective row unit of the first row of row units. In addition, the agricultural implement includes a row of fertilizer applicators coupled to the frame and positioned between the first row of row units and the second row of row units relative to the direction of travel of the agricultural implement. Each fertilizer applicator of the row of fertilizer applicators is laterally positioned between one row unit of the first row of row units and one row unit of the second row of row units that is laterally adjacent to the one row unit of the first row of row units, and each fertilizer applicator of the row of fertilizer applicators is configured to direct displaced soil laterally toward the one row unit of the second row of row units. Furthermore, no fertilizer applicator is positioned within the first row of row units, no fertilizer applicator is positioned within the second row of row units, and no row unit is positioned within the row of fertilizer applicators.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
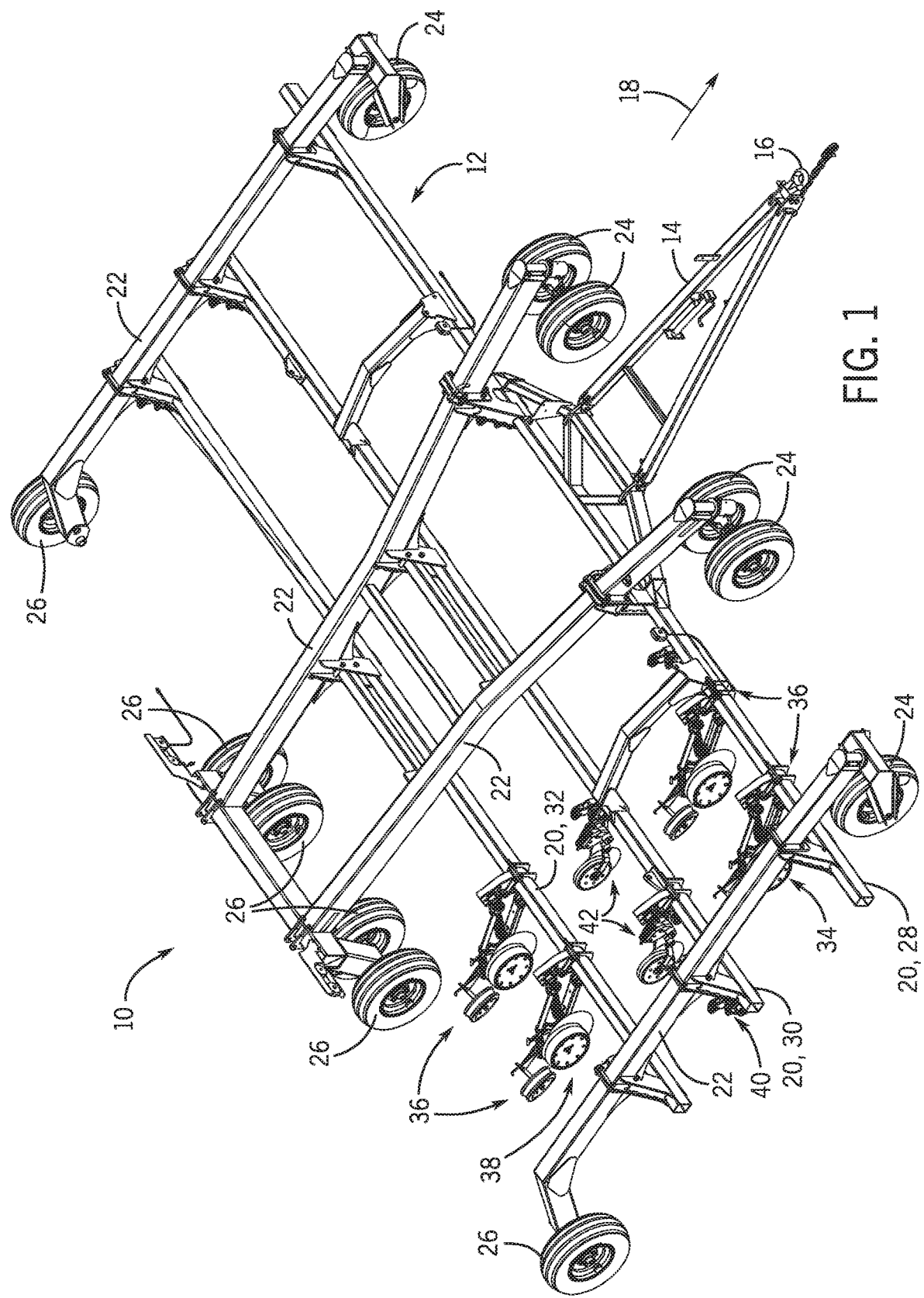
FIG. 1 is a perspective view of an embodiment of an agricultural implement having mid-mounted fertilizer applicators.

FIG. 1 is a perspective view of an embodiment of an agricultural implement 10 having mid-mounted fertilizer applicators. As illustrated, the agricultural implement 10 includes a frame 12 and a tow bar 14 coupled to the frame 12. In the illustrated embodiment, the tow bar 14 is pivotally coupled to the frame 12 and includes a hitch 16. The hitch 16 is configured to interface with a corresponding hitch of a work vehicle (e.g., tractor, etc.), thereby enabling the work vehicle to tow the agricultural implement 10 through a field along a direction of travel 18. While the illustrated tow bar 14 forms an A-frame in the illustrated embodiment, in certain embodiments, the tow bar may have any other suitable configured (e.g., a single bar extending along the direction of travel, etc.). In addition, while the tow bar 14 is pivotally coupled to the frame 12 in the illustrated embodiment, in certain embodiments, the tow bar may be rigidly coupled to the frame. Furthermore, in certain embodiments, the hitch 16 may be coupled to a corresponding hitch of another implement (e.g., an air cart, etc.), and the other implement may be coupled to the work vehicle (e.g., via respective hitches). While the agricultural implement 10 is configured to be towed through the field by a work vehicle in the illustrated embodiment, in certain embodiments, the agricultural implement may be part of a self-propelled vehicle (e.g., in which the frame of the agricultural implement is coupled to a main frame/chassis of the self-propelled vehicle).

In the illustrated embodiment, the frame 12 of the agricultural implement 10 includes three toolbars 20 and four supports 22. As illustrated, wheels are coupled to the supports 22, and the supports 22 are coupled to the toolbars 20 (e.g., via fasteners, via a welded connection, etc.). In the illustrated embodiment, front wheel(s) 24 are rotatably coupled to a respective front portion of each support 22, and rear wheel(s) 26 are rotatably coupled to a respective rear portion of each support 22. The front portion of each support 22 is positioned forward of the respective rear portion relative to the direction of travel 18. The wheels maintain the supports 22 above the surface of the field and enable the agricultural implement 10 to move along the direction of travel 18. In the illustrated embodiment, pivotal connections between the front wheels 24 and the respective supports 22 enable the front wheels 24 to caster, thereby enhancing the turning ability of the agricultural implement 10 (e.g., at a headland, during transport, etc.). However, in certain embodiments, at least one front wheel may be non-pivotally coupled to the respective support, and/or at least one rear wheel may be pivotally coupled to the respective support. While the frame 12 of the agricultural implement 10 has four supports 22 in the illustrated embodiment, in certain embodiments, the agricultural implement may have more or fewer supports (e.g., 0, 1, 2, 3, 4, 5, 6, or more). Furthermore, in certain embodiments, the toolbars 20 of the frame 12 may be supported by other and/or additional suitable structures (e.g., connectors extending between toolbars, wheel mounts coupled to toolbars, etc.).

As previously discussed, three toolbars 20 are coupled to the supports 22, and the supports 22 position the three toolbars 20 above a surface (e.g., soil surface) of the field. In the illustrated embodiment, the toolbars 20 include a first toolbar 28, a second toolbar 30, and a third toolbar 32. The first toolbar 28 is positioned forward of the second toolbar 30 relative to the direction of travel 18, and the second toolbar 30 is positioned forward of the third toolbar 32 relative to the direction of travel 18. In the illustrated embodiment, each toolbar 20 is substantially perpendicular to the direction of travel 18. However, in certain embodiments, at least one toolbar may be angled relative to the direction of travel (e.g., 1 to 45 degrees, 5 to 30 degrees, or 5 to 20 degrees relative to the direction of travel). While the frame 12 of the agricultural implement 10 has three toolbars 20 in the illustrated embodiment, in certain embodiments, the frame may include more or fewer toolbars (e.g., 1, 2, 3, 4, 5, 6, 7, 8, 9, 10, or more). Furthermore, in certain embodiments, at least one toolbar may include one or more pivot joints configured to enable outer portions of the toolbar to fold upwardly (e.g., to a transport position).

In the illustrated embodiment, a first row 34 of row units 36 is coupled to the first toolbar 28, and a second row 38 of row units 36 is coupled to the third toolbar 32. Each row unit 36 of the first row 34 is configured to deposit seeds into the soil, and each row unit 36 of the second row 38 is configured to deposit seeds into the soil. For example, certain row units 36 (e.g., all of the row units 36 of the agricultural implement 10, a portion of the row units 36 of the agricultural implement 10, at least one row unit 36 of the agricultural implement 10, etc.) include an opener configured to form a trench within the soil for seed deposition into the soil. The opener may include an opener disc, a knife, or any other suitable tool configured to form a suitable trench within the soil. The row unit 36 also includes a seed tube (e.g., coupled to the opener, positioned adjacent to the opener, positioned behind the opener, etc.) configured to deposit seeds into the trench formed by the opener. In certain embodiments, the opener/seed tube may be followed by a closing assembly (e.g., including closing discs, etc.) that moves displaced soil back into the trench, and/or a packer assembly (e.g., including a packer wheel, etc.) that packs soil on top of the deposited seeds. As discussed in detail below, each row unit 36 of the second row 38 is laterally offset (e.g., offset in a direction perpendicular to the direction of travel 18) from a respective row unit 36 of the first row 34, such that two adjacent rows of seeds are planted within the soil. While the illustrated agricultural implement 10 includes two row units 36 in the first row 34 and two row units 36 in the second row 38 for illustrative purposes, the agricultural implement may have any suitable number of row units in the first row and any suitable number of row units in the second row. For example, the agricultural implement may include 5, 10, 15, 20, 25, or 30 row units in the first row and a corresponding number of row units in the second row. Furthermore, in certain embodiments, the second row may include more or fewer row units than the first row. For example, if the second row includes more row units than the first row, at least two row units of the second row may be laterally offset from a common respective row unit of the first row.

In the illustrated embodiment, a row 40 of fertilizer applicators 42 is coupled to the second toolbar 30. Each fertilizer applicator 42 is configured to deposit fertilizer into the soil. For example, certain fertilizer applicators 42 (e.g., all of the fertilizer applicators 42 of the agricultural implement 10, a portion of the fertilizer applicators 42 of the agricultural implement 10, at least one fertilizer applicator 42 of the agricultural implement 10, etc.) include an opener configured to form a trench within the soil for fertilizer deposition into the soil. The opener may include a coulter disc, a knife, or any other suitable tool configured to form a suitable trench within the soil. The fertilizer applicator 42 also includes a fertilizer tube (e.g., coupled to the opener, positioned adjacent to the opener, positioned behind the opener, etc.) configured to deposit fertilizer into the trench formed by the opener. As discussed in detail below, each fertilizer applicator 42 of the row 40 of fertilizer applicators 42 is laterally positioned between one row unit 36 of the first row 34 and one row unit 36 of the second row 38 that is laterally adjacent to the one row unit 36 of the first row 34 (e.g., positioned between the row units along a direction perpendicular to the direction of travel 18). Accordingly, fertilizer is disposed within the soil between laterally adjacent rows of seeds. The fertilizer may flow through the soil to the seeds of each laterally adjacent seed row, thereby providing the seeds with fertilizer. While the illustrated agricultural implement 10 includes two fertilizer applicators 42 for illustrative purposes, the agricultural implement may have any suitable number of fertilizer applicators in the row of fertilizer applicators. For example, the agricultural implement may include 5, 10, 15, 20, 25, or 30 fertilizer applicators in the row of fertilizer applicators.

In the illustrated embodiment, no fertilizer applicator 42 is coupled to the first toolbar 28, no fertilizer applicator 42 is coupled to the third toolbar 32, and no row unit 36 is coupled to the second toolbar 30. Accordingly, no fertilizer applicator 42 is positioned within the first row 34 of row units 36, no fertilizer applicator 42 is positioned within the second row 38 of row units 36, and no row unit 36 is positioned within the row 40 of fertilizer applicators 42. As discussed in detail below, each row unit 36 includes an adjustment assembly configured to control the penetration depth of the opener into the soil, thereby controlling seed deposition depth. Positioning the row units 36 at the front and rear of the agricultural implement 10 facilitates access to the adjustment assemblies. As a result, the process of reconfiguring the row units to deposit seeds at a different depth may be substantially less time-consuming, as compared to reconfiguring row units on an agricultural implement having fertilizer applicators positioned forward and/or rearward of the row units. Accordingly, the efficiency of the seeding process may be substantially enhanced.

While no fertilizer applicator is positioned within the first row of row units, no fertilizer applicator is positioned within the second row of row units, and no row unit is positioned within the row of fertilizer applicators in the illustrated embodiment, in certain embodiments, at least one fertilizer applicator may be positioned within at least one row of row units, and/or at least one row unit may be positioned within the row of fertilizer applicators. Furthermore, while the illustrated agricultural implement includes two rows of row units and one row of fertilizer applicators, in certain embodiments, the agricultural implement may include more rows of row units and/or more rows of fertilizer applicators. For example, the agricultural implement may include two front rows of row units forward of the row of fertilizer applicators and/or two rear rows of row units rearward of the row of fertilizer applicators.

As used herein with respect to the first/second row of row units and the row of fertilizer applicators, "row" refers to a collection of row units/fertilizer applicators that extends generally along a lateral axis of the agricultural implement (e.g., an axis perpendicular to the direction of travel of the agricultural implement). A row of row units/fertilizer applicators may be straight, curved, staggered, or have any other suitable configuration. However, in the embodiments disclosed herein, the rows of row units/fertilizer applicators do not overlap one another along the direction of travel of the agricultural implement (e.g., the longitudinal axis of the agricultural implement). Accordingly, in the illustrated embodiment, each row unit of the first row of row units is positioned forward of each fertilizer applicator of the row of fertilizer applicators relative to the direction of travel, and each fertilizer applicator of the row of fertilizer applicators is positioned forward of each row unit of the second row of row units relative to the direction of travel. Furthermore, while the first row of row units, the second row of row units, and the row of fertilizer applicators are each substantially perpendicular to the direction of travel in the illustrated embodiment, in certain embodiments, at least one row may be angled (e.g., 1 to 45 degrees, 5 to 30 degrees, or 5 to 20 degrees, etc.) relative to the direction of travel (e.g., in embodiments in which the respective toolbar(s) are angled relative to the direction of travel).

Furthermore, as used herein with regard to row units, "laterally adjacent" refers to two row units that are positioned directly adjacent to one another along the lateral axis. Accordingly, no row unit is positioned between two laterally adjacent row units along the lateral axis. However, as indicated above, a fertilizer applicator may be positioned between two laterally adjacent row units. For example, one row unit of the first row may be positioned laterally adjacent to one row unit of the second row. In such a configuration, no other row unit on the agricultural implement is positioned between the one row unit of the first row and the one row unit of the second row along the lateral axis. However, a fertilizer applicator of the row of fertilizer applicators may be positioned between the two laterally adjacent row units.

Furthermore, as used herein with regard to a row unit and a fertilizer applicator, "laterally adjacent" references to a row unit and a fertilizer applicator that are positioned directly adjacent to one another along the lateral axis. Accordingly, no other row unit or fertilizer applicator is positioned between the laterally adjacent row unit/fertilizer applicator along the lateral axis.

In addition, while each fertilizer applicator is positioned between two laterally adjacent row units in the illustrated embodiment, in certain embodiments, multiple fertilizer applicators (e.g., 2, 3, 4, 5, 6, or more) may be positioned between a pair of adjacent row units. Furthermore, while the agricultural implement does not include a fertilizer applicator between certain pairs of laterally adjacent row units in the illustrated embodiment, in certain embodiments, a fertilizer applicator may be positioned between each pair of laterally adjacent row units. In addition, in certain embodiments, a fertilizer applicator may be positioned laterally outward from the farthest laterally outward row unit (e.g., on one lateral side of the agricultural implement or on both lateral sides of the agricultural implement). In such embodiments, the farthest laterally outward fertilizer applicator is not considered part of the row of fertilizer applicators (e.g., because the farthest laterally outward fertilizer applicator is not laterally positioned between two laterally adjacent row units).

Figure 2:
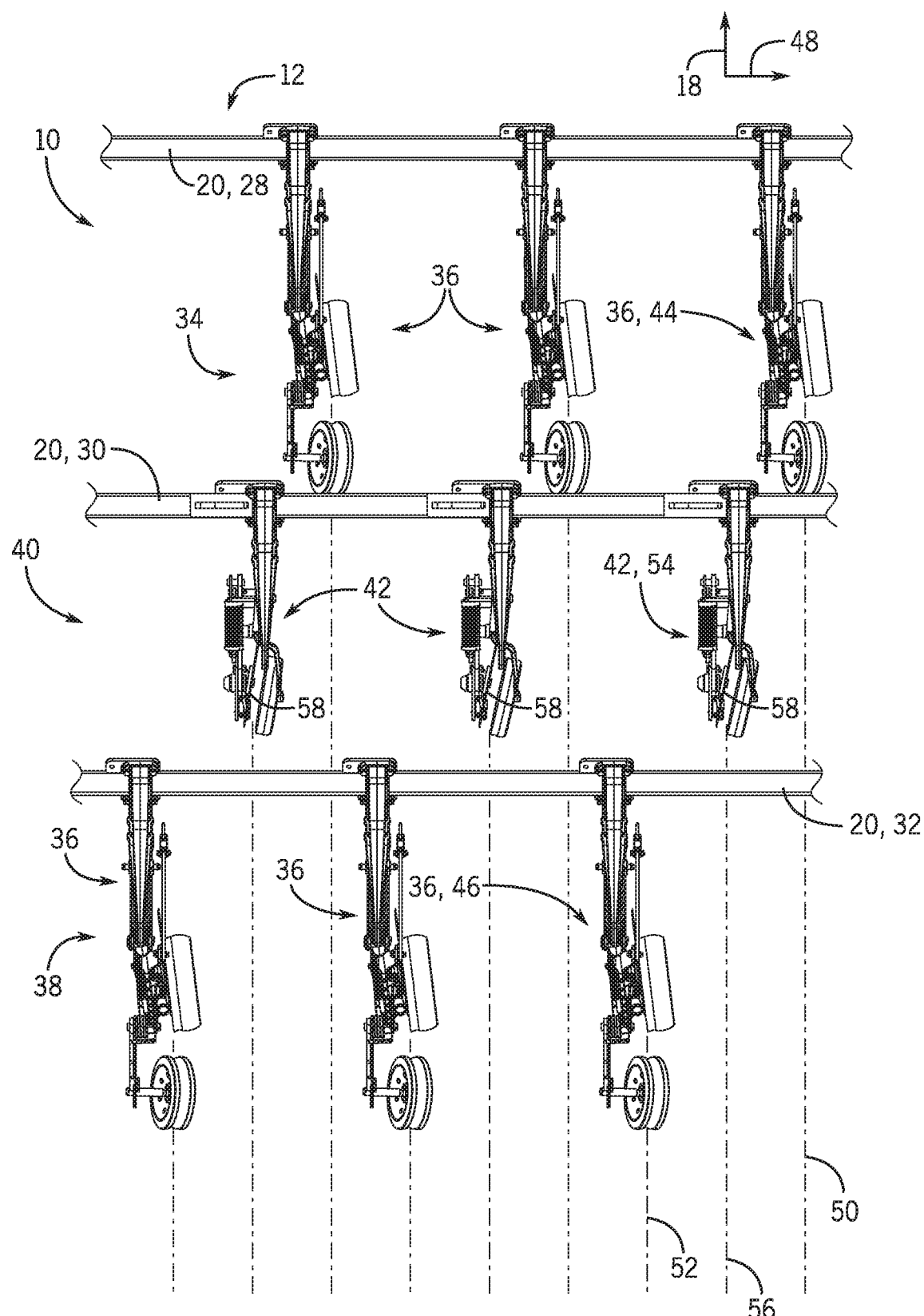
FIG. 2 is a top view of a portion of the agricultural implement of FIG. 1.

FIG. 2 is a top view of a portion of the agricultural implement 10 of FIG. 1. As illustrated, the second row 38 of row units 36 is positioned behind the first row 34 of row units 36 relative to the direction of travel 18 of the agricultural implement 10. In addition, each row unit 36 of the second row 38 is laterally offset from a respective row unit 36 of the first row 34. For example, one row unit 44 of the first row 34 is offset from one respective row unit 46 of the second row 38 along the lateral axis 48, which may be substantially perpendicular to the direction of travel 18. Accordingly, a first trench/row of seeds 50 formed/deposited by the one row unit 44 of the first row 34 is laterally offset (e.g., offset along the lateral axis 48) from a second trench/row of seeds 52 formed/deposited by the one row unit 46 of the second row 38. Because each row unit of the first and second rows is configured to form a respective trench/row of seeds, and each row unit of the second row is laterally offset from a respective row unit of the first row, multiple laterally offset trenches/rows of seeds may be formed by the agricultural implement. The spacing between adjacent trenches/rows of seeds along the lateral axis may be adjusted by controlling the lateral offset between row units of the first row and the lateral offset between each row unit of the second row and the respective row unit of the first row. For example, the lateral row spacing may be selected based on crop type, soil conditions, climate, other suitable factors, or a combination thereof. By way of example, the row spacing (e.g., the spacing between each trench/row of seeds along the lateral axis) may be about 5 inches (12.7 cm) to about 50 inches (127 cm), about 7 inches (17.8 cm) to about 30 inches (76.2 cm), or about 15 inches (38.1 cm) to about 30 inches (76.2 cm).

As illustrated, the row 40 of fertilizer applicators 42 is positioned between the first row 34 of row units 36 and the second row 38 of row units 36 relative to the direction of travel 18 of the agricultural implement 10. In addition, each fertilizer applicator 42 of the row 40 of fertilizer applicators 42 is laterally positioned between a row unit 36 of the first row 34 and a row unit 36 of the second row 38. For example, one fertilizer applicator 54 of the row 40 of fertilizer applicators 42 is positioned between the one row unit 44 of the first row 34 and the one row unit 46 of the second row 38 along the lateral axis 48. Accordingly, a third trench/row of fertilizer 56 formed/deposited by the one fertilizer applicator 54 is positioned between the first trench/row of seeds 50 and the second trench/row of seeds 52 along the lateral axis 48. Because each fertilizer applicator 42 is configured to form a respective trench/row of fertilizer, and each fertilizer applicator 42 is positioned between a row unit 36 of the first row 34 and a laterally adjacent row unit 36 of the second row 38, a row of fertilizer may be positioned between adjacent rows of seeds. The fertilizer may flow through the soil to the seeds of each adjacent seed row, thereby providing the seeds with fertilizer. In certain embodiments, each fertilizer applicator 42 of the row 40 of fertilizer applicators is laterally positioned substantially equidistant between a row unit 36 of the first row 34 and a laterally adjacent row unit 36 of the second row 38. Accordingly, the row of fertilizer formed by the fertilizer applicator may be laterally positioned substantially equidistant between the adjacent rows of seeds, thereby providing the seeds of each row of seeds with a substantially equal amount of fertilizer. However, in certain embodiments, the fertilizer applicator may be positioned to establish a row of fertilizer closer to one row of seeds than the row of seeds positioned on the opposite lateral side of the row of fertilizer.

In the illustrated embodiment, each fertilizer applicator 42 of the row 40 of fertilizer applicators 42 is configured to direct displaced soil laterally outward toward a respective row unit 36 of the second row 38. As previously discussed, the opener of the fertilizer applicator is configured to form a trench within the soil for fertilizer deposition into the soil. As the trench is formed within the soil, the opener displaces the soil that previously filled the trench (e.g., to one or both sides of the trench). In the illustrated embodiment, each fertilizer applicator 42 is configured to direct the displaced soil to a portion of the field that is engaged by a laterally adjacent row unit 36 of the second row 38. As a result, the row unit 36 of the second row 38 incorporates at least a portion of the displaced soil back into the field as the row unit forms the respective trench. In addition, the closing assembly and/or the packer assembly of the row unit 36 of the second row 38 may further smooth the surface of the field. Accordingly, a closing assembly and a packer assembly may be omitted from the fertilizer applicator. Furthermore, because the displaced soil is directed laterally outward to the laterally adjacent row unit of the second row, the fertilizer applicator may not interference interfere with the trench/seed row formed by the laterally adjacent row unit of the first row. Therefore, the agricultural implement may establish a substantially smooth and level field while performing seeding operations.

In the illustrated embodiment, each fertilizer applicator 42 includes a coulter disc 58 configured to open the trench into the soil. As illustrated, the coulter disc 58 of each fertilizer applicator 42 is angled relative to the direction of travel 18. Accordingly, the coulter disc 58 directs the displaced soil laterally toward the laterally adjacent row unit 36 of the second row 38. Furthermore, in certain embodiments, at least one fertilizer applicator of the row of fertilizer applicators may include another suitable opener (e.g., knife, shank, etc.) configured to open a trench into the soil and to direct the displaced soil laterally outward toward the laterally adjacent row unit of the second row. In addition, in certain embodiments, at least one fertilizer applicator may be configured to direct displaced soil in another suitable direction (e.g., directly behind the fertilizer applicator, toward the laterally adjacent row unit of the first row, etc.).

In such embodiments, the fertilizer applicator may include a closing assembly and/or a packer assembly to smooth and level the surface of the field.

Positioning the row units 36 at the front and rear of the agricultural implement 10, as illustrated, facilitates access to the adjustment assemblies of the row units. As a result, the process of reconfiguring the row units to deposits seeds at a different depth may be substantially less time-consuming, as compared to reconfiguring row units on an agricultural implement having fertilizer applicators positioned forward and/or rearward of the row units. Furthermore, the effectiveness of fertilizer is generally less sensitive to the deposition depth of the fertilizer within the soil (e.g., as compared to the crop yield sensitivity to seed deposition depth). Accordingly, the deposition depth of the fertilizer may be adjusted significantly less frequently (e.g., very infrequently, never, etc.) than the deposition depth of seeds into the soil. As such, positioning the fertilizer applicators 42 in the middle of the agricultural implement 10 relative to the direction of travel 18 may not significantly affect (e.g., may not affect) the reconfiguration time of the agricultural implement, which as indicated above, may be substantially reduced due to positioning the row units at the front and rear of the agricultural implement.

In the illustrated embodiment, the row units 36 of the first row 34 of row units 36 are coupled to the first toolbar 28, the fertilizer applicators 42 of the row 40 of fertilizer applicators 42 are coupled to the second toolbar 30, and the row units 36 of the second row 38 of row units 36 are coupled to the third toolbar 32. However, in certain embodiments, the row units of the first row, the row units of the second row, the fertilizer applicators, or any combination thereof, may be coupled to any other suitable structure of the frame of the agricultural implement. For example, at least one row unit/fertilizer applicator of at least one row may be coupled to a longitudinally extending member of the frame, a support of the frame, another suitable component of the frame, or a combination thereof.

Figure 3:
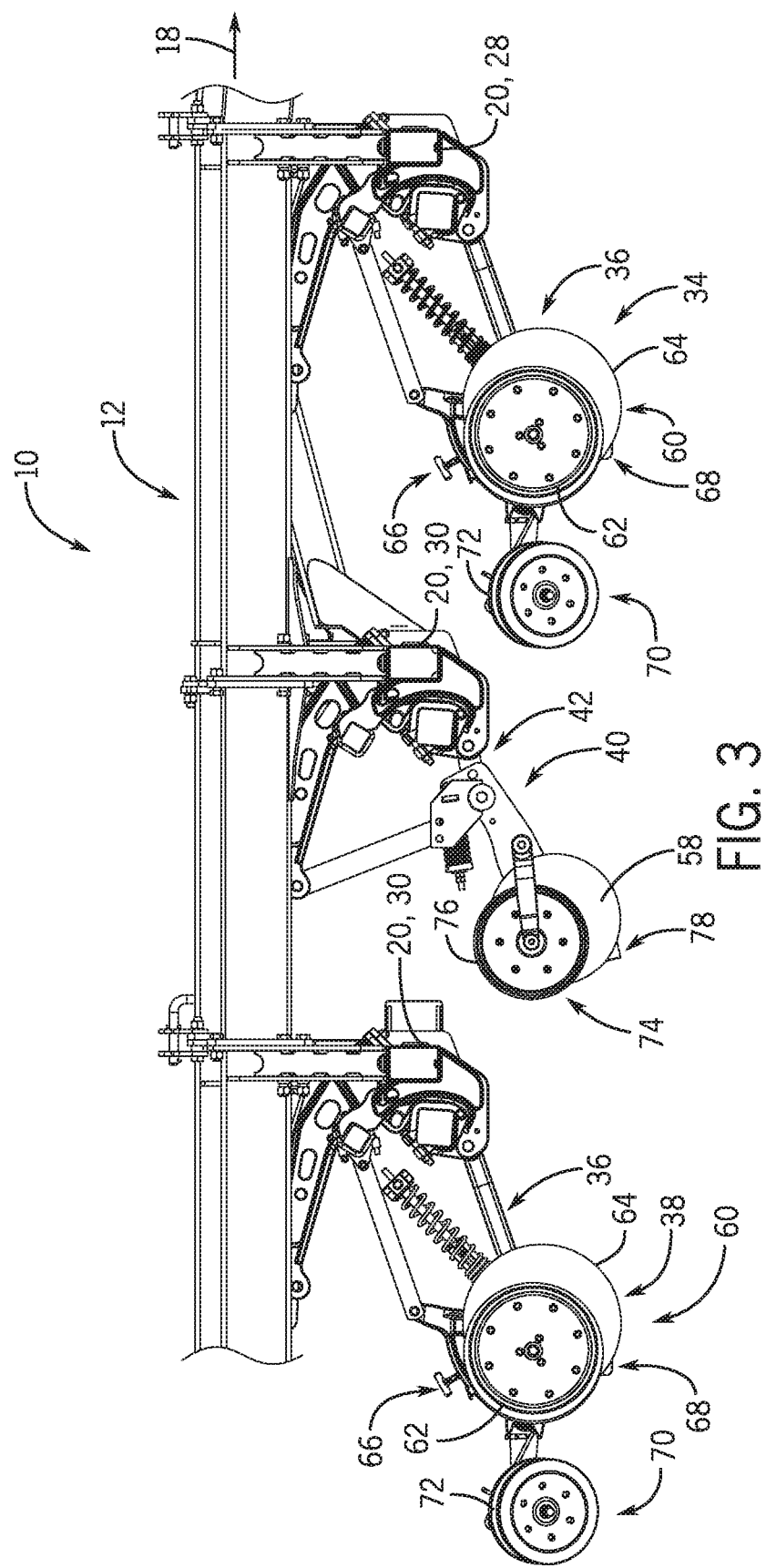
FIG. 3 is a side view of a portion of the agricultural implement of FIG. 1.

FIG. 3 is a side view of a portion of the agricultural implement 10 of FIG. 1. As previously discussed, the agricultural implement 10 includes a first row 34 of row units 36, a second row 38 of row units 36, and a row 40 of fertilizer applicators 42 positioned between the rows of row units along the direction of travel 18. Each row unit 36 is configured to deposit seeds at a target depth beneath the soil surface as the row unit 36 traverses the field along the direction of travel 18. Each row unit 36 includes an opener assembly 60 that forms a trench in the soil for seed deposition into the soil. In the illustrated embodiment, the opener assembly 60 includes a gauge wheel 62 and an opener disc 64. The opener disc 64 is configured to excavate a trench into the soil, and the gauge wheel 62 is configured to control a penetration depth of the opener disc 64 into the soil. Furthermore, in the illustrated embodiment, each row unit 36 includes an adjustments assembly 66 configured to control the vertical position of the gauge wheel 62, thereby controlling the penetration depth of the opener disc 64 into the soil. While each opener assembly 60 includes an opener disc 64 and a gauge wheel 62 in the illustrated embodiment, in certain embodiments, at least one opener assembly may include other and/or additional suitable device(s) configured to form a trench within the soil, such as a knife, a shank, or a coulter disc.

Each row unit 36 includes a seed tube 68 configured to deposit seeds into the trench formed by the opener disc 64. In certain embodiments, the seed tube 68 is positioned directly adjacent to the opener disc 64 (e.g., between the opener disc and a scraper configured to remove soil from the opener disc/widen the trench formed by the opening disc). In the illustrated embodiment, the opener assembly 60 and the seed tube 68 are followed by a packer assembly 70 configured to pack soil on top of the deposited seeds. The packer assembly 70 includes a packer wheel 72 configured to roll along the soil surface, thereby packing soil on top of the deposited seeds. While the packer assembly includes a packer wheel in the illustrated embodiment, in certain embodiments, the packer assembly may include any other suitable device configured to pack soil onto the deposited seeds. Furthermore, while each row unit includes a packer assembly in the illustrated embodiment, in certain embodiments, the packer assembly may be omitted from at least one row unit. In addition, in certain embodiments, at least one row unit may include a closing assembly positioned between the opening assembly/seed tube and the packer assembly along the direction of travel of the agricultural implement. The closing assembly may include one or more closing discs configured to direct displaced soil into the trench formed by the opening assembly, thereby covering the seeds with soil before the soil is packed by the packer assembly.

Each fertilizer applicator 42 is configured to deposit fertilizer at a target depth beneath the soil surface as the fertilizer applicator 42 traverses the field along the direction of travel 18. Each fertilizer applicator 42 includes a opener assembly 74 that forms a trench in the soil for fertilizer deposition into the soil. In the illustrated embodiment, the opener assembly 74 includes a gauge wheel 76 and the coulter disc 58. The coulter disc 58 is configured to excavate a trench into the soil, and the gauge wheel 76 is configured to control a penetration depth of the coulter disc 58 into the soil. In certain embodiments, each fertilizer applicator may include an adjustment assembly configured to control the vertical position of the gauge wheel, thereby controlling the penetration depth of the coulter disc into the soil. While each opener assembly 74 includes a coulter disc 58 and a gauge wheel 76 in the illustrated embodiment, in certain embodiments, at least one opener assembly may include other and/or additional suitable device(s) configured to form a trench within the soil, such as a knife, a shank, or an opener disc. Each fertilizer applicator 42 includes a fertilizer tube 78 configured to deposit fertilizer into the trench formed by the coulter disc 58. In certain embodiments, the fertilizer tube 78 is positioned directly adjacent to the coulter disc 58 (e.g., within a scraper configured to remove soil from the coulter disc/widen the trench formed by the coulter disc).

As previously discussed, the coulter disc 58 of each fertilizer applicator 42 is angled relative to the direction of travel 18. Accordingly, the coulter disc 58 directs the displaced soil laterally toward the laterally adjacent row unit 36 of the second row 38. As a result, the row unit 36 of the second row 38 incorporates at least a portion of the displaced soil back into the field as the row unit forms the respective trench. In addition, the closing assembly and/or the packer assembly 70 of the row unit 36 of the second row 38 may further smooth the surface of the field. Accordingly, a closing assembly and a packer assembly may be omitted from the fertilizer applicator. However, in certain embodiments, the coulter disc 58 may direct the displaced soil in another suitable direction, or the laterally adjacent row unit 36 of the second row 38 may not engage the soil displaced by the coulter disc 58. In such embodiments, the opener assembly and the fertilizer tube of the fertilizer applicator may be followed by a packer assembly configured to pack soil on top of the deposited fertilizer. The packer assembly may include a packer wheel configured to roll along the soil surface, thereby packing soil on top of the deposited fertilizer. Furthermore, in certain embodiments, at least one fertilizer applicator may include a closing assembly (e.g., positioned between the opener assembly/fertilizer tube and the packer assembly along the direction of travel of the agricultural implement). The closing assembly may include one or more closing discs configured to direct displaced soil into the trench formed by the opener assembly, thereby cover the fertilizer with soil (e.g., before the soil is packed by the packer assembly).

As previously discussed, positioning the row units 36 at the front and rear of the agricultural implement 10, as illustrated, facilitates access to the adjustment assemblies 66 of the row units 36. As a result, the process of reconfiguring the row units to deposits seeds at a different depth may be substantially less time-consuming, as compared to reconfiguring row units on an agricultural implement having fertilizer applicators positioned forward and/or rearward of the row units. Furthermore, the effectiveness of fertilizer is generally less sensitive to the deposition depth of the fertilizer within the soil (e.g., as compared to the crop yield sensitivity to seed deposition depth). Accordingly, the deposition depth of the fertilizer may be adjusted significantly less frequently (e.g., very infrequently, never, etc.) than the deposition depth of seeds into the soil. As such, positioning the fertilizer applicators 42 in the middle of the agricultural implement 10 relative to the direction of travel 18 may not significantly affect (e.g., may not affect) the reconfiguration time of the agricultural implement, which as indicated above, may be substantially reduced due to positioning the row units at the front and rear of the agricultural implement.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement, comprising:
   a frame;
   a first row of row units coupled to the frame, wherein each row unit of the first row of row units is configured to deposit seeds into soil, and each row unit of the first row of row units comprises a packer assembly, a closing assembly, or a combination thereof;
   a second row of row units coupled to the frame, wherein the second row of row units is positioned behind the first row of row units relative to a direction of travel of the agricultural implement, each row unit of the second row of row units is configured to deposit seeds into the soil, each row unit of the second row of row units is laterally offset from a respective row unit of the first row of row units, and each row unit of the second row of row units comprises a packer assembly, a closing assembly, or a combination thereof; and a row of fertilizer applicators coupled to the frame and positioned between the first row of row units and the second row of row units relative to the direction of travel of the agricultural implement, wherein each fertilizer applicator of the row of fertilizer applicators is laterally positioned between one row unit of the first row of row units and one row unit of the second row of row units that is laterally adjacent to the one row unit of the first row of row units, each fertilizer applicator of the row of fertilizer applicators is configured to direct displaced soil laterally toward the one row unit of the second row of row units, each fertilizer applicator of the row of fertilizer applicators does not comprise a packer assembly, each fertilizer applicator of the row of fertilizer applicators does not comprise a closing assembly, and each fertilizer applicator of the row of fertilizer applicators is coupled to the frame independently of a row unit;

wherein no fertilizer applicator is positioned within the first row of row units, no fertilizer applicator is positioned within the second row of row units, no row unit is positioned within the row of fertilizer applicators.

2. The agricultural implement of claim 1, wherein at least one fertilizer applicator of the row of fertilizer applicators comprises a coulter disc configured to open a trench into the soil.

3. The agricultural implement of claim 2, wherein the coulter disc of the at least one fertilizer applicator is angled relative to the direction of travel of the agricultural implement to direct the displaced soil laterally toward the one row unit of the second row of row units.

4. The agricultural implement of claim 1, wherein at least one row unit of the first row of row units comprises an opener disc configured to open a trench into the soil.

5. The agricultural implement of claim 1, wherein at least one row unit of the second row of row units comprises an opener disc configured to open a trench into the soil.

6. The agricultural implement of claim 1, wherein each fertilizer applicator of the row of fertilizer applicators is laterally positioned substantially equidistant between the one row unit of the first row of row units and the one row unit of the second row of row units.

7. The agricultural implement of claim 1, wherein the first row of row units, the second row of row units, the row of fertilizer applicators, or a combination thereof, is substantially perpendicular to the direction of travel of the agricultural implement.

8. An agricultural implement, comprising:
a frame comprising a first toolbar, a second toolbar, and a third toolbar, the first toolbar is positioned forward of the second toolbar relative to a direction of travel of the agricultural implement, and the second toolbar is positioned forward of the third toolbar relative to the direction of travel of the agricultural implement;
a first row of row units coupled to the first toolbar, wherein each row unit of the first row of row units is configured to deposit seeds into soil, and each row unit of the first row of row units comprises a packer assembly, a closing assembly, or a combination thereof;
a second row of row units coupled to the third toolbar, wherein each row unit of the second row of row units is configured to deposit seeds into the soil, each row unit of the second row of row units is laterally offset from a respective row unit of the first row of row units, and each row unit of the second row of row units comprises a packer assembly, a closing assembly, or a combination thereof; and a row of fertilizer applicators coupled to the second toolbar, wherein each fertilizer applicator of the row of fertilizer applicators is laterally positioned between one row unit of the first row of row units and one row unit of the second row of row units that is laterally adjacent to the one row unit of the first row of row units, each fertilizer applicator of the row of fertilizer applicators is configured to direct displaced soil laterally toward the one row unit of the second row of row units, each fertilizer applicator of the row of fertilizer applicators does not comprise a packer assembly, each fertilizer applicator of the row of fertilizer applicators does not comprise a closing assembly, and each fertilizer applicator of the row of fertilizer applicators is coupled to the frame independently of a row unit;
wherein no fertilizer applicator is coupled to the first toolbar, no fertilizer applicator is coupled to the third toolbar, and no row unit is coupled to the second toolbar.

9. The agricultural implement of claim 8, wherein at least one fertilizer applicator of the row of fertilizer applicators comprises a coulter disc configured to open a trench into the soil.

10. The agricultural implement of claim 9, wherein the coulter disc of the at least one fertilizer applicator is angled relative to the direction of travel of the agricultural implement to direct the displaced soil laterally toward the one row unit of the second row of row units.

11. The agricultural implement of claim 8, wherein at least one row unit of the first row of row units comprises an opener disc configured to open a trench into the soil.

12. The agricultural implement of claim 8, wherein at least one row unit of the second row of row units comprises an opener disc configured to open a trench into the soil.

13. The agricultural implement of claim 8, wherein each fertilizer applicator of the row of fertilizer applicators is laterally positioned substantially equidistant between the one row unit of the first row of row units and the one row unit of the second row of row units.

14. The agricultural implement of claim 8, wherein the first toolbar, the second toolbar, the third toolbar, or a combination thereof, is substantially perpendicular to the direction of travel of the agricultural implement.

15. An agricultural implement, comprising:
a frame;
a first row of row units coupled to the frame, wherein each row unit of the first row of row units comprises a first opener disc configured to open a first trench into soil and a first seed tube configured to deposit seeds into the first trench, and each row unit of the first row of row units comprises a packer assembly, a closing assembly, or a combination thereof;
a second row of row units coupled to the frame, wherein the second row of row units is positioned behind the first row of row units relative to a direction of travel of the agricultural implement, each row unit of the second row of row units comprises a second opener disc configured to open a second trench into the soil and a second seed tube configured to deposit the seeds into the second trench, each row unit of the second row of row units is laterally offset from a respective row unit of the first row of row units, such that the second trench is laterally offset from the first trench, and each row unit of the second row of row units comprises a packer assembly, a closing assembly, or a combination thereof; and a row of fertilizer applicators coupled to the frame and positioned between the first row of row units and the second row of row units relative to the direction of travel of the agricultural implement, wherein each fertilizer applicator of the row of fertilizer applicators comprises a coulter disc configured to open a third trench into the soil, each fertilizer applicator of the row of fertilizer applicators is laterally positioned between one row unit of the first row of row units and one row unit of the second row of row units that is laterally adjacent to the one row unit of the first row of row units, such that the third trench is laterally positioned between the first trench formed by the one row unit of the first row of row units and the second trench formed by the one row unit of the second row of row units, the coulter disc of each fertilizer applicator of the row of fertilizer applicators is angled relative to the direction of travel of the agricultural implement to direct displaced soil laterally toward the one row unit of the second row of row units, each fertilizer applicator of the row of fertilizer applicators does not comprise a packer assembly, each fertilizer applicator of the row of fertilizer applicators does not comprise a closing assembly, and each fertilizer applicator of the row of fertilizer applicators is coupled to the frame independently of a row unit;

wherein no fertilizer applicator is positioned within the first row of row units, no fertilizer applicator is positioned within the second row of row units, and no row unit is positioned within the row of fertilizer applicators.

16. The agricultural implement of claim 15, wherein the frame comprises a first toolbar, a second toolbar, and a third toolbar, the first toolbar is positioned forward of the second toolbar relative to the direction of travel of the agricultural implement, and the second toolbar is positioned forward of the third toolbar relative to the direction of travel of the agricultural implement.

17. The agricultural implement of claim 16, wherein the first row of row units is coupled to the first toolbar, the second row of row units is coupled to the third toolbar, and the row of fertilizer applicators is coupled to the second toolbar.

18. The agricultural implement of claim 17, wherein the first toolbar, the second toolbar, the third toolbar, or a combination thereof, is substantially perpendicular to the direction of travel of the agricultural implement.

19. The agricultural implement of claim 15, wherein each fertilizer applicator of the row of fertilizer applicators is laterally positioned substantially equidistant between the one row unit of the first row of row units and the one row unit of the second row of row units, such that the third trench is laterally positioned substantially equidistant between the first trench formed by the one row unit of the first row of row units and the second trench formed by the one row unit of the second row of row units.

20. The agricultural implement of claim 15, wherein the first row of row units, the second row of row units, the row of fertilizer applicators, or a combination thereof, is substantially perpendicular to the direction of travel of the agricultural implement.

* * * * *